United States Patent
Lefebvre et al.

(10) Patent No.: US 7,330,187 B2
(45) Date of Patent: Feb. 12, 2008

(54) HYBRID PROCESSING OF OPENGL DISPLAY LIST COMMANDS

(75) Inventors: Kevin T. Lefebvre, Fort Collins, CO (US); Don B. Hoffman, Fort Collins, CO (US); Michael T Hamilton, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 843 days.

(21) Appl. No.: 10/629,930

(22) Filed: Jul. 29, 2003

(65) Prior Publication Data

US 2005/0024366 A1 Feb. 3, 2005

(51) Int. Cl.
*G06T 15/00* (2006.01)

(52) U.S. Cl. .................. 345/522; 345/537; 703/2; 703/6; 715/760; 715/763

(58) Field of Classification Search ................ 345/522, 345/537, 519; 703/2, 6; 715/760, 762, 763
See application file for complete search history.

(56) References Cited

U.S. PATENT DOCUMENTS 6,731,314 B1 * 5/2004 Cheng et al. ............... 715/848
6,880,129 B1 * 4/2005 Lee et al. ................... 715/763
7,015,919 B1 * 3/2006 Stauffer et al. ............. 345/543

* cited by examiner

*Primary Examiner*—Phu K. Nguyen

(57) ABSTRACT

A hybrid method or apparatus for processing OpenGL display list commands. A deamon intercepts display list commands issued by a client to an OpenGL stack. Responsive to a newList [list commands] endList sequence: the daemon stores a representation of a first subset of the list commands; and creates, in the stack, a display list corresponding to a second subset of the list commands. Responsive to a callList command: the daemon issues to the stack at least one immediate mode command corresponding to the first subset of the list commands and at least one callList command invoking the display list corresponding to the second subset of the list commands. The daemon may also store a representation of an expression or function. Responsive to the callList command, the daemon may evaluate the expression or function and conditionally change the step of invoking the display list based on the outcome.

15 Claims, 3 Drawing Sheets

HYBRID PROCESSING OF OPENGL DISPLAY LIST COMMANDS

FIELD OF THE INVENTION

This invention relates generally to computer graphics, and more particularly to methods and apparatus for processing OpenGL display lists.

BACKGROUND

The graphics standard known as "OpenGL" defines a software interface for controlling graphics display systems. More specifically, it defines a number of commands that may be issued by client software to cause an OpenGL-compliant graphics system to draw. Some OpenGL commands are designed to place the graphics system into a particular state (e.g., set the current color to a particular color, or set the current model view matrix to a certain value). Other commands are designed to specify primitives for rendering (e.g., define the vertices of a triangle or other polygon).

It is common for client software to issue OpenGL commands in what is called immediate mode so that the commands will be executed upon receipt by the graphics system. But OpenGL also includes a notion of display lists. A display list represents a set of one or more commands. Once created, a display list is stored for possible later or repeated invocation by client software. For example, a display list might be created for rendering a wheel and then invoked four times to draw the four wheels of a car. For further background information on OpenGL and OpenGL display lists, see for example *OpenGL Programming Guide* (Addison-Wesley, 1993).

In practice, an OpenGL implementation is often provided in the form of a "stack" that includes an OpenGL library, one or more device drivers, and a hardware subsystem for accelerating rendering operations and driving a display device. An application or client may utilize the functionality exposed by an OpenGL stack by issuing OpenGL commands or function calls to the stack. This may be done locally in cases where the application is executing on the same host as the stack. Or this may be done remotely in cases where the application is executing on a first host while the OpenGL stack and display hardware are resident on a second host networked to the first host. Although many different commercially available stacks are OpenGL compliant, performance and extra features vary from one vendor's stack to another's.

SUMMARY OF THE INVENTION

According to a preferred embodiment, the invention includes a hybrid method or apparatus for processing OpenGL display list commands issued by a client. A daemon and an OpenGL stack are provided. The daemon intercepts display list commands issued by the client to the stack. Responsive to an intercepted newList [list commands] endList command sequence: the daemon stores a representation of a first subset of the list commands; and creates, in the stack, a display list corresponding to a second subset of the list commands. Responsive to an intercepted callList command: the daemon issues to the stack at least one immediate mode command corresponding to the first subset of the list commands and at least one callList command invoking the display list corresponding to the second subset of the list commands. The invention is hybrid in nature because part of the application's display list is stored in the daemon, while another part of the list is stored in the OpenGL stack. The hybrid nature of the invention makes it possible to add functionality to an off-the-shelf OpenGL stack without altering the stack in any way. Moreover, good performance is maintained.

For example, in a further aspect of the invention, the daemon may, responsive to the intercepted newList [list commands] endList command sequence, store a representation of an expression or function; and, responsive to the intercepted callList command, evaluate the expression or function and conditionally change the step of invoking the display list based on the outcome of evaluating the expression or function.

DETAILED DESCRIPTION OF THE PREFERRED EMBODIMENTS

Figure 1:
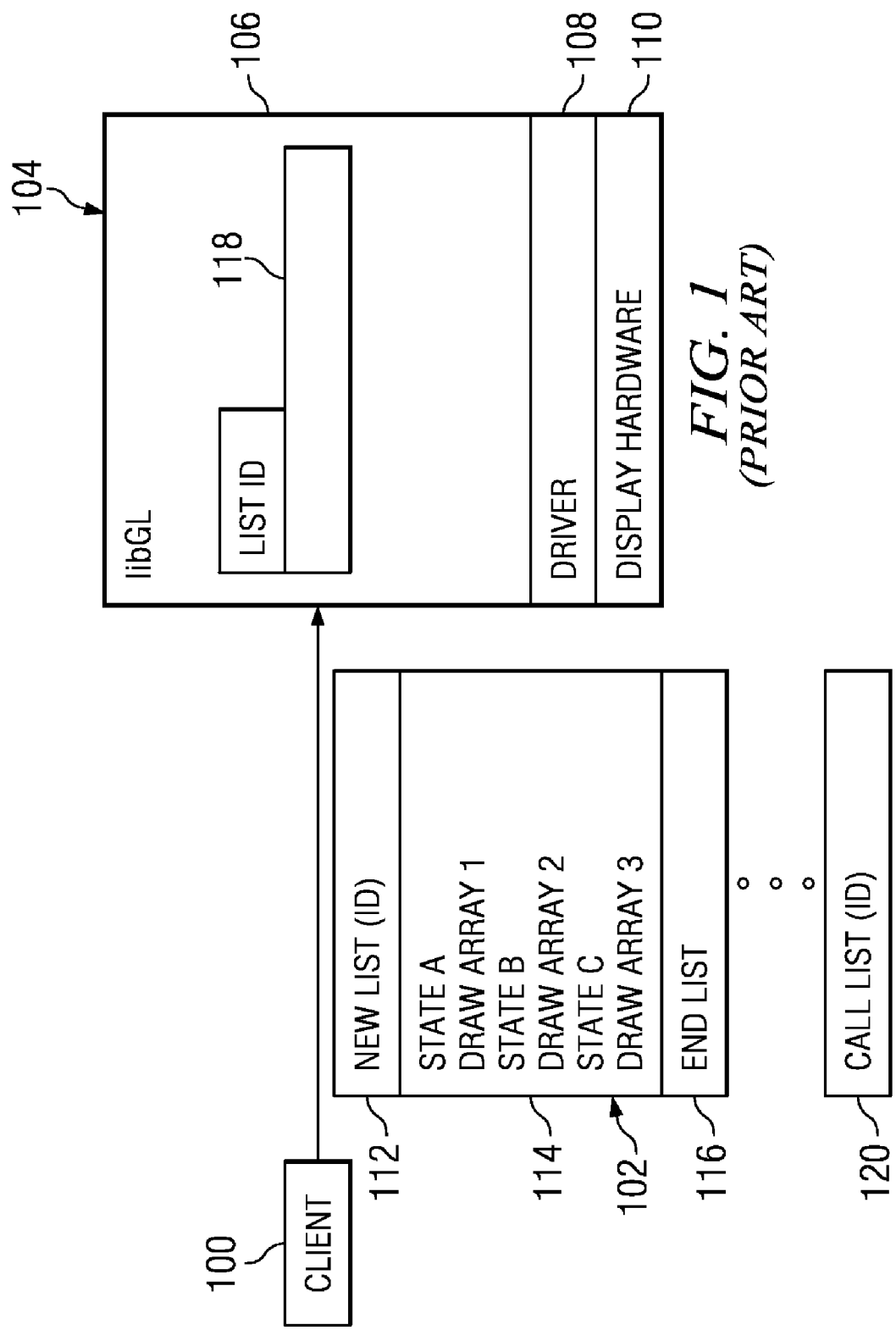
FIG. 1 is a block diagram illustrating a prior art arrangement wherein a client software system issues OpenGL commands to an OpenGL stack.

FIG. 1 illustrates a prior art arrangement wherein a client software system 100 issues OpenGL commands 102 to an OpenGL stack 104. A typical OpenGL stack might include an OpenGL library such as libGL 106, one or more device drivers 108, and display hardware 110. Client system 100 and stack 104 may reside in the same host computer (in a local configuration), or they may reside in separate host computers networked together (in a remote configuration). In a local configuration, a typical client system 100 might include application software. In a remote configuration, client system 100 might additionally include a client-side OpenGL implementation which in turn would forward OpenGL commands issued by application software to remote stack 104 using the network.

The OpenGL commands 102 shown in FIG. 1 are intended to exemplify, for purposes of illustration, a typical sequence of display list commands that might be issued to an OpenGL stack by a client software system. For the sake of clarity, the notation shown in the drawing is pseudo-code only, not syntactically detailed OpenGL. To create a display list, client system 100 would normally issue a newList [list commands] endList sequence as shown in the drawing at blocks 112, 114, 116. When issuing newList command 112, client system 100 specifies an id to be associated with the newly created list. Then client system issues a series of list commands 114 that it wants included in the new display list. In the example shown in FIG. 1, list commands 114 include state command A, draw array 1, state command B, draw array 2, state command c, and draw array 3. Finally, client system 100 issues endList command 116 to signal the end of list commands 114 and to cause stack 104 to process and store the new list 118 for later invocation. When client system 100 desires for stack 104 to execute the new display list, it issues callList command 120, specifying the previously-given id as an argument. Upon receipt of callList command 120, stack 104 executes the list 118 that corresponds to the specified id.

Figure 2:
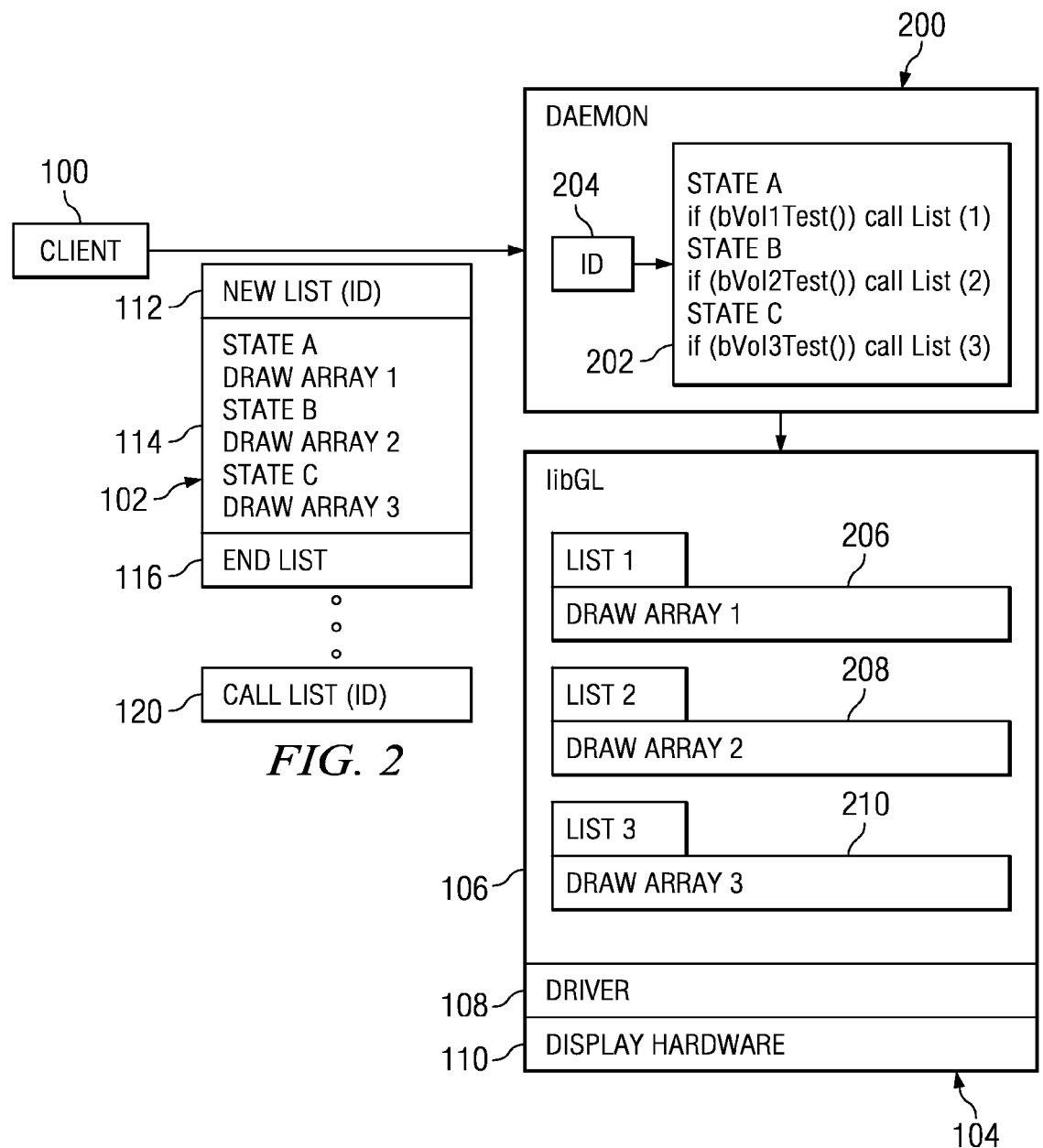
FIG. 2 is a block diagram illustrating a first preferred embodiment of the invention wherein a daemon intercepts display list commands issued by a client software system.

Hybrid Processing of Display List Commands. FIG. 2 illustrates a first preferred embodiment of the invention wherein a daemon 200 intercepts display list commands 102 issued by client software system 100. To create a display list for later invocation, client system 100 issues the same sequence of commands as in the previous example. Also as before, client system 100 issues callList command 120 (specifying the list id) when it desires to have the newly created list executed. In the configuration of FIG. 2, however, commands 102 are not executed directly by stack 104. Instead, they are intercepted by daemon 200 as shown.

Responsive to newList [list commands] endList command sequence 102, daemon 200 stores a representation of a subset of list commands 114, such as state commands A, B and C, as shown in the drawing at 202. Preferably, command representations 202 are stored in the daemon and are associated with the list id 204 that was specified by client system 100 when it issued newList command 112. In addition to storing command representations 202, daemon 200 also creates one or more display lists in stack 104. These latter display lists correspond to another subset of list commands 114, such as draw arrays 1, 2 and 3. In the example of FIG. 2, daemon 200 might accomplish this by issuing three newList [list commands] endList command sequences to stack 104 to create lists 1, 2 and 3 in stack 104 as shown at 206, 208, 210.

When client system 100 desires to have its newly created list executed, it issues callList command 120. In response, daemon 200 may issue immediate mode commands to stack 104. The immediate mode commands so issued would correspond to the commands represented at 202. In addition, daemon 200 may issue one or more callList commands to stack 104. The callList commands so issued would correspond to the display lists 206, 208 and/or 210 that were previously created by daemon 200. Thus the client's display list is executed, but in a hybrid fashion wherein a portion of the list is stored in daemon 200 and another portion is stored in stack 104.

Addition of Bounding Volume Functionality. The hybrid nature of the inventive apparatus and method makes it possible to add functionality to an off-the-shelf OpenGL stack without altering the stack in any way, while still retaining good performance. For example, the embodiment shown in FIG. 2 illustrates a preferred technique for adding bounding volume functionality to display lists in cases where such functionality is not provided by stack 104.

By way of background, bounding volumes are a known performance enhancement technique in computer graphics. A simple shape such as a cube may be defined to enclose a more complex shape such as a star. In such an example the cube would be referred to as the bounding volume for the star. During rendering, the coordinates defining the cube are compared with the coordinates defining a viewing volume. If the cube is outside the viewing volume, then the star is not rendered; otherwise, the star is rendered. It is computationally simpler to compare the viewing volume with a simple shape such as the cube than it is to compare it with a complex shape such as the star. Consequently, the use of bounding volumes helps to conserve resources and improve performance.

Referring again to FIG. 2, daemon 200 may automatically generate bounding volumes corresponding to geometry elements contained in list commands 114. Specifically, responsive to newList [list commands] endList sequence 102, daemon 200 may determine bounding volumes for the geometry elements indicated by draw arrays 1, 2 and 3. Known techniques may be used to determine the bounding volumes. For example, the extrema of the x, y and z coordinates corresponding to draw array 1 may be used to define a rectangular bounding volume for draw array 1. The same technique may be employed to define a bounding volume for draw array 2, and for draw array 3. (It should be noted that, although draw arrays are shown in the example, any technique or command may be used to specify geometric primitives in list commands 114. Bounding volumes may be computed on a primitive-by-primitive basis regardless of the form in which the primitives are specified.) Daemon 200 then inserts one or more expressions or functions into command representations 202 so that the bounding volumes so computed may be used when the client's display list is invoked.

When client system 100 issues callList command 120 to invoke its display list, daemon 200 may then evaluate the expressions or functions and, depending on the value computed, change its behavior regarding invocation of display lists 206, 208 and 210. In the example of FIG. 2, the expressions or functions are illustrated generically by the three "if" statements in command representations 202. For a primitive whose bounding volume intersects the viewing volume (e.g., if(bVol1 Test( )), then daemon 200 may issue a callList command to stack 104 in order to render that primitive (e.g., callList(1)). But for a primitive whose bounding volume does not intersect the viewing volume, then daemon 200 may suppress the callList command and simply move on to the next line in command representations 202. Other visibility indicators (including those derived by means other than bounding volume tests) may also be used to determine whether or not to invoke one of display lists 206, 208 or 210.

Figure 3:
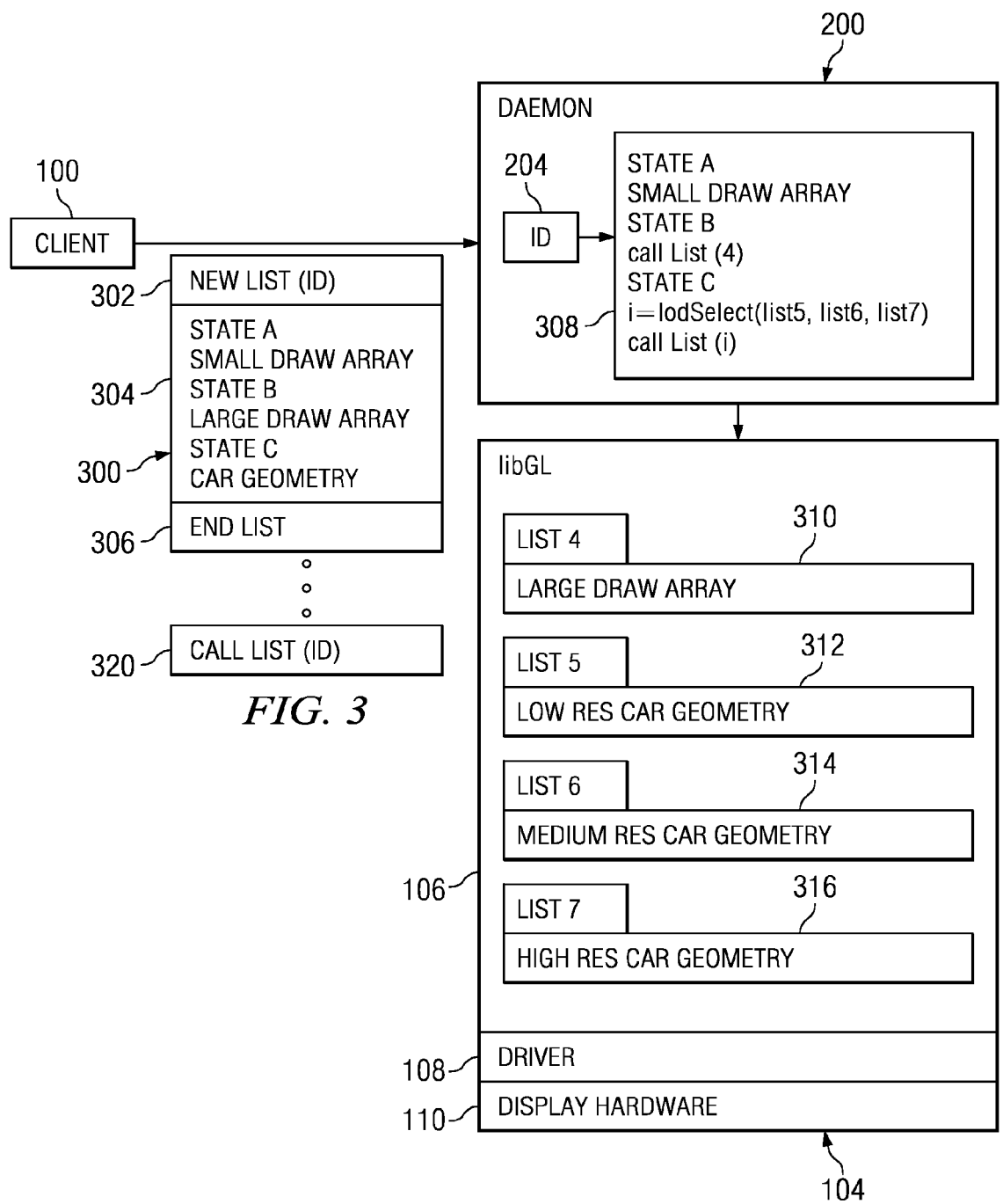
FIG. 3 is a block diagram illustrating a second preferred embodiment of the invention wherein a daemon intercepts display list commands issued by a client software system.

Addition of LOD Functionality. Another application of hybrid display list processing is to add level of detail (LOD) functionality where such functionality is not provided by stack 104. Such an application is illustrated in FIG. 3. As in the previous examples, client system 100 issues a newList [list commands] endList sequence 300 in order to create a new display list having a client-specified id. Sequence 300 might include newList command 302, list commands 304, and endList command 306.

Responsive to sequence 300, daemon 200 may create several display lists in stack 104. For example, daemon 200 may store the small draw array in command representations 308 in order to conserve the overhead of creating and calling a display list. But on the other hand, daemon 200 may create display list 310 in stack 104, which display list corresponds to the large draw array. (The overhead of creating and invoking display list 310 will generally be cost effective for computationally intensive primitives or geometries.)

When daemon 200 encounters the car geometry specified in list commands 300, it may create numerous display lists in stack 104 to represent the same geometry at different levels of detail. In the example, daemon 200 creates three such lists: List 312 represents the car geometry at a low level of detail or resolution. List 314 represents the car geometry at a medium level of detail or resolution. And list 316 represents the car geometry at a high level of detail or resolution. In addition, daemon 200 may insert an expression or function into command representations 308. One technique for doing so is indicated generically in the drawing by the assignment statement "i=lodSelect(list5, list6, list7)."

When client system 100 issues callList command 320 to have its display list executed, daemon 200 may parse through its command representations 308 as in the previous examples, issuing immediate mode OpenGL commands to stack 104 in order to execute the corresponding commands. But in this case, daemon 200 will automatically determine an appropriate level of detail prior to rendering the car geometry, and will issue a callList command to stack 104 to invoke the one car geometry display list that corresponds to the desired level of detail. Specifically, daemon 200 will evaluate the function lodSelect to determine an id or level of detail indicator for one of the three lists 312, 314 or 316. It will then specify the corresponding id when it issues the callList command ("callList(i)") shown at the end of command representations 308.

Persons having ordinary skill in the art will appreciate that the above-described invention may be implemented in hardware logic or in software logic, or both. In addition, daemon 200 may be implemented in a variety of ways as appropriate given the configuration into which it is deployed. For example, daemon 200 may be implemented using a stand-alone process, or it may constitute one or more threads of an existing process, and/or it may be implemented as part of a library.

We claim:

1. A method for processing OpenGL display list commands issued by a client, comprising:
   providing a daemon and an OpenGL stack;
   intercepting display list commands issued by the client to the stack;
   responsive to an intercepted newList, endList command sequence:
      storing, in the daemon, a representation of a first subset of the list commands; and
      creating, in the stack, a display list corresponding to a second subset of the list commands; and
   responsive to an intercepted callList command, causing the daemon to issue to the stack:
      at least one immediate mode command corresponding to the first subset of the list commands; and
      at least one callList command invoking the display list corresponding to the second subset of the list commands.

2. The method of claim 1, further comprising:
   responsive to the intercepted newList, endList command sequence:
      storing, in the daemon, a representation of an expression or function; and
   responsive to the intercepted callList command, causing the daemon to:
      evaluate the expression or function; and
         depending on the value of the expression or function, conditionally change the step of invoking the display list.

3. The method of claim 2, wherein:
   creating the display list comprises creating plural display lists corresponding to different levels of detail;
   evaluating the expression or function yields a level of detail indicator; and
   conditionally changing the step of invoking the display list comprises invoking, from among the plural display lists, the one display list whose level of detail corresponds to the level of detail indicator.

4. The method of claim 2, wherein:
   evaluating the expression or function yields a visibility indicator; and
   conditionally changing the step of invoking the display list comprises invoking or not invoking the display list depending on the value of the visibility indicator.

5. The method of claim 4, wherein:
   the visibility indicator represents whether a pre-defined bounding volume intersects a viewing volume.

6. Apparatus for processing OpenGL display list commands issued by a client, comprising:
   daemon logic and an OpenGL stack;
   means for intercepting display list commands issued by the client to the stack;
   means for responding to an intercepted newList, endList command sequence, comprising:
      means for storing, in the daemon, a representation of a first subset of the list commands; and
      means for creating, in the stack, a display list corresponding to a second subset of the list commands; and
   means for responding to an intercepted callList command by causing the daemon to issue to the stack:
      at least one immediate mode command corresponding to the first subset of the list commands; and
      at least one callList command invoking the display list corresponding to the second subset of the list commands.

7. The apparatus of claim 6, further comprising:
   means for responding to the intercepted newList, endList command sequence by storing, in the daemon, a representation of an expression or function; and
   means for responding to the intercepted callList command comprising:
      means for evaluating the expression or function; and
         means for, depending on the value of the expression or function, conditionally changing the step of invoking the display list.

8. The apparatus of claim 7, wherein:
   the means for creating the display list comprises means for creating plural display lists corresponding to different levels of detail;
   the means for evaluating the expression or function yields a level of detail indicator; and wherein
   conditionally changing the step of invoking the display list comprises invoking, from among the plural display lists, the one display list whose level of detail corresponds to the level of detail indicator.

9. The apparatus of claim 7, wherein:
   the means for evaluating the expression or function yields a visibility indicator; and wherein
   conditionally changing the step of invoking the display list comprises invoking or not invoking the display list depending on the value of the visibility indicator.

10. The apparatus of claim 9, wherein:
    the visibility indicator represents whether a pre-defined bounding volume intersects a viewing volume.

11. A storage medium comprising program code embodied in a storage medium which, when executed by one or more processing devices, implements a method for processing OpenGL display list commands issued by a client, the method comprising:
    providing a daemon and an OpenGL stack;
    intercepting display list commands issued by the client to the stack;
    responsive to an intercepted newList, endList command sequence:
       storing, in the daemon, a representation of a first subset of the list commands; and
       creating, in the stack, a display list corresponding to a second subset of the list commands; and
    responsive to an intercepted callList command, causing the daemon to issue to the stack:

at least one immediate mode command corresponding to the first subset of the list commands; and at least one callList command invoking the display list corresponding to the second subset of the list commands.

12. The storage medium of claim 11, wherein the method further comprises:

responsive to the intercepted newList, endList command sequence:

storing, in the daemon, a representation of an expression or function; and responsive to the intercepted callList command, causing the daemon to:

evaluate the expression or function; and depending on the value of the expression or function, conditionally change the step of invoking the display list.

13. The storage medium of claim 12, wherein:

creating the display list comprises creating plural display lists corresponding to different levels of detail;

evaluating the expression or function yields a level of detail indicator; and conditionally changing the step of invoking the display list comprises invoking, from among the plural display lists, the one display list whose level of detail corresponds to the level of detail indicator.

14. The storage medium of claim 12, wherein:

evaluating the expression or function yields a visibility indicator; and conditionally changing the step of invoking the display list comprises invoking or not invoking the display list depending on the value of the visibility indicator.

15. The storage medium of claim 14, wherein:

the visibility indicator represents whether a pre-defined bounding volume intersects a viewing volume.

* * * * *

UNITED STATES PATENT AND TRADEMARK OFFICE
CERTIFICATE OF CORRECTION

PATENT NO. : 7,330,187 B2
APPLICATION NO. : 10/629930
DATED : February 12, 2008
INVENTOR(S) : Kevin T. Lefebvre et al.

Page 1 of 1

It is certified that error appears in the above-identified patent and that said Letters Patent is hereby corrected as shown below:

In column 3, line 7, after "command 120" delete "25".

Signed and Sealed this
Seventh Day of June, 2011

David J. Kappos
*Director of the United States Patent and Trademark Office*